United States Patent
Hatcher, Jr. et al.

(10) Patent No.: US 9,874,109 B2
(45) Date of Patent: Jan. 23, 2018

(54) SYSTEM AND METHOD FOR CONTROLLING ICE FORMATION ON GAS TURBINE INLET GUIDE VANES

(71) Applicants: Clifford Hatcher, Jr., Orlando, FL (US); Forrest R. Ruhge, Orlando, FL (US)

(72) Inventors: Clifford Hatcher, Jr., Orlando, FL (US); Forrest R. Ruhge, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 939 days.

(21) Appl. No.: 13/904,066

(22) Filed: May 29, 2013

(65) Prior Publication Data

US 2014/0356122 A1    Dec. 4, 2014

(51) Int. Cl.
*F01D 25/02* (2006.01)
*G01M 15/14* (2006.01)
*F01D 21/00* (2006.01)
*F02C 7/047* (2006.01)
(Continued)

(52) U.S. Cl.
CPC ........... *F01D 25/02* (2013.01); *F01D 21/003* (2013.01); *F02C 7/047* (2013.01); *F02C 7/057* (2013.01); *G01M 15/14* (2013.01); *F05D 2260/80* (2013.01); *F05D 2270/44* (2013.01); *F05D 2270/804* (2013.01); *F05D 2270/8041* (2013.01); *G01J 5/0088* (2013.01)

(58) Field of Classification Search
CPC ........ F01D 21/003; F01D 25/02; F02C 7/047; F02C 7/057; G01M 15/14
See application file for complete search history.

(56) References Cited

U.S. PATENT DOCUMENTS 4,831,819 A * 5/1989 Norris .................... F02C 7/047
                                                244/134 R
5,823,474 A   10/1998 Nunnally
(Continued)

FOREIGN PATENT DOCUMENTS

DE          8621003 U1    9/1987

OTHER PUBLICATIONS

Laser Focus World, Photonic Frontiers: Room Temperature IR Imaging: Microbolometer arrays enable uncooled infrared camera, 2012.*

(Continued)

*Primary Examiner* — Woody Lee, Jr.

(57) ABSTRACT

Gas turbine inlet guide vane ice detection and control systems and methods that utilize active infra-red monitoring of inlet guide vanes, detection of ice formation on the guide vanes and elimination of the ice by altering properties of the gas turbine inlet intake airflow, such as by introducing compressed and/or heated air bled from the turbine. Ice has lower detectable emissivity intensity in the infra-red spectrum than ice-free inlet guide vane surfaces. Ice formation is inhibited by direct monitoring of inlet guide vane icing conditions, rather than by indirect empirical assumptions of ice formation based on atmospheric condition monitoring. Direct monitoring mitigates ice formation in real time without reliance on excessive use of gas turbine compressed or heated air bleed, which enhances turbine operational efficiency.

16 Claims, 5 Drawing Sheets

(51) Int. Cl.
*F02C 7/057* (2006.01)
*G01J 5/00* (2006.01)

(56) References Cited

U.S. PATENT DOCUMENTS

| | | | |
|---|---|---|---|
| 2003/0035719 A1* | 2/2003 | Wadia | F01D 25/02 415/145 |
| 2005/0263646 A1 | 12/2005 | Nichols | |
| 2008/0092516 A1* | 4/2008 | Lockwood | F02C 7/047 60/39.093 |
| 2008/0129541 A1* | 6/2008 | Lu | G06K 9/00791 340/905 |
| 2008/0273972 A1* | 11/2008 | Bagnall | F01D 5/143 415/208.1 |
| 2013/0101414 A1* | 4/2013 | Weitkamp | F03D 1/0675 416/1 |

OTHER PUBLICATIONS

Thermalcities.com, A primer on Infra-red thermography, 2015.*
David M. Mass et al., "Turbine Inlet Ice Related Failures and Predicting Ice Formation", Proceedings of GT2007, ASME Turbo Expo 2007; May 14-17, 2007, Montreal, Canada.

* cited by examiner

SYSTEM AND METHOD FOR CONTROLLING ICE FORMATION ON GAS TURBINE INLET GUIDE VANES

BACKGROUND OF THE INVENTION

1. Field of the Invention

The invention relates to gas turbine inlet guide vane ice detection and control systems and methods. More particularly the invention utilizes active infra-red monitoring of inlet guide vanes, detection of ice formation on the guide vanes and elimination of the ice by altering properties of the gas turbine inlet intake airflow, such as by introducing compressed and/or heated air bled from the turbine.

2. Description of the Prior Art

Gas turbines risk ice formation on inlet guide vanes and subsequent ice ingestion when relative humidity and temperature properties of engine intake air within the turbine inlet drop its dew point below water freezing temperature. Intake air flows at sufficiently high velocity to lower its temperature below that of ambient air. Therefore, while ambient air temperature may be above the water freezing point, the combination of relative humidity and lower air temperature within the turbine intake may lead to ice formation on inlet guide vanes. When ice breaks off an inlet guide vane it is ingested by the turbine, potentially causing damage to internal components such as blades and vanes.

In order to reduce risk of ice formation turbine operators monitor intake air properties, such as humidity and temperature, and alter those properties to maintain the dew point above water freezing temperature as an indirect empirical way to prevent ice formation. Relatively conservative turbine operating procedures are followed, based on empirical rules. For example, specific quantities of compressed air can be bled from the turbine compressor section and introduced within the intake airflow to lower relative humidity and raise the dew point temperature when monitored air properties based on rigid control settings or reference to temperature-humidity charts supplied by turbine manufacturers. Heated air bled from the combustor section may be introduced into the airflow to raise its temperature so that any condensed moisture is above water freezing temperature. In some operating circumstances both compressed and heated air may need to be introduced into the air intake airflow. It is desirable to minimize compressed or heated air bleeding as they otherwise lower gas turbine operating efficiency. The bled air otherwise would be used to generate additional power in the gas turbine. Empirical rule-based air bleed operational procedures often intentionally factor additional higher safety margins to minimize potential ice formation and ingestion variables that cannot be totally foreseen under all operating conditions. The added conservative safety margins further reduce turbine operating efficiency.

Thus, a need exists for a gas turbine inlet guide vane ice formation monitoring and control system that reduces quantity and/or frequency of compressed and/or heated air bleed from the gas turbine in order to improve operating efficiency.

Another need exists for a gas turbine inlet guide vane ice formation monitoring and control system that directly monitors ice formation and takes corrective action to modify intake airflow properties by introducing bleed compressed and/or heated air based at least in part on the observed need to stop observed ice formation conditions.

SUMMARY OF THE INVENTION

Accordingly, an object of the invention is to create a gas turbine inlet guide vane ice formation monitoring and control system that reduces quantity and/or frequency of compressed and/or heated air bleed from the gas turbine in order to improve operating efficiency.

Another object of the invention is to create a gas turbine inlet guide vane ice formation monitoring and control system that directly monitors ice formation and takes corrective action to modify intake airflow properties by introducing bleed compressed and/or heated air based air based at least in part on the observed need to stop observed ice formation conditions.

These and other objects are achieved in accordance with the present invention by gas turbine inlet guide vane ice detection and control systems and methods that utilize active infra-red monitoring of inlet guide vanes, detection of ice formation on the guide vanes and elimination of the ice by altering properties of the gas turbine inlet intake airflow, such as by introducing compressed and/or heated air bled from the turbine. Ice has a lower detected emissivity in the infra-red spectrum than surrounding inlet guide vane surfaces that do not have any surface ice. These systems and methods control ice formation by direct monitoring in the infra-red spectrum of inlet guide vane emissivity that is indicative of icing conditions, rather than by indirect empirical assumptions of ice formation based on atmospheric condition monitoring. Direct monitoring mitigates ice formation in real time without reliance on excessive use of gas turbine compressed or heated air bleeds operational safety margins that are frequently employed in the known indirect monitoring systems. Thus direct monitoring of icing conditions reduces need for excessive turbine bleed air and enhances turbine operational efficiency.

Embodiments of the invention feature a method for detecting and alleviating ice formation on inlet guide vanes of a gas turbine by viewing a gas turbine inlet guide vane with an infra-red camera. The infra-red camera is used to actively monitoring emissivity intensity of the inlet guide vane. An icing condition is detected when the monitored emissivity is indicative of ice formation on the inlet guide vane. The detected ice formation is alleviated by altering intake airflow properties into the gas turbine, such as by bleeding compressor pressurized air or combustor heated air into the gas turbine intake airflow. Various monitored emissivity ice formation indicia may be utilized in the system. Non-limiting examples of such indicia include: viewed inlet guide vane aggregate emissivity intensity dropping below a defined threshold; defined percentage of viewed inlet guide vane having emissivity intensity dropping below a defined threshold; mapping of viewed inlet guide vane emissivity intensity and identification of mapping patterns; and viewed inlet guide vane rate of emissivity intensity drop exceeding a defined threshold.

Other embodiments of the invention feature a method for detecting and alleviating ice formation on inlet guide vanes of a gas turbine, comprising viewing a gas turbine inlet guide vane with an infra-red camera having a micro bolometer detector in which detector electrical conductivity changes in response to temperature changes. In some embodiments the camera actively monitors emissivity intensity of the inlet guide vane preferably in a wavelength range of 3-13 μm and detects when monitored emissivity is indicative of ice formation on the inlet guide vane. The detected ice formation is alleviated by altering intake airflow properties into the gas turbine comprising bleeding compressor pressurized air or combustor heated air into the gas turbine intake airflow in a feedback loop with the detecting step.

Additional embodiments of the invention feature a system for detecting and alleviating ice formation on inlet guide vanes of a gas turbine, including an infra-red camera viewing a gas turbine inlet guide vane and capturing emissivity intensity images of the inlet guide vane. In some embodiments the infra-red camera has a micro bolometer detector in which detector electrical conductivity changes in response to temperature changes and/or the infra-red camera actively monitoring emissivity intensity of the inlet guide vane in a wavelength range of 3-13 μm. The system also has a controller coupled to the infra-red camera that actively monitors the infra-red camera emissivity intensity images, detects when monitored emissivity is indicative of ice formation on the inlet guide vane and sends output commands to the gas turbine to alter intake airflow properties into the gas turbine in response to detected ice formation, so as to alleviate ice formation on the inlet guide vane. In some embodiments the infra-red camera is oriented external the gas turbine and views the inlet guide vane through a viewing window formed in a housing of the gas turbine. Various monitored emissivity ice formation indicia may be utilized in the system controller. Non-limiting examples of such indicia include: viewed inlet guide vane aggregate emissivity intensity dropping below a defined threshold; defined percentage of viewed inlet guide vane having emissivity intensity dropping below a defined threshold; mapping of viewed inlet guide vane emissivity intensity and identification of mapping patterns; and viewed inlet guide vane rate of emissivity intensity drop exceeding a defined threshold.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in gas turbine inlet guide vane ice detection and control systems and methods that utilize active infra-red monitoring of inlet guide vanes, detection of ice formation on the guide vanes and elimination of the ice by altering properties of the gas turbine inlet intake airflow, such as by introducing compressed and/or heated air bled from the turbine. These systems and methods control ice formation by direct monitoring of inlet guide vane icing conditions, rather than by indirect empirical assumptions of ice formation based on atmospheric condition monitoring. Direct monitoring mitigates ice formation in real time without reliance on excessive use of gas turbine compressed or heated air bleeds operational safety margins that are frequently employed in the known indirect monitoring systems. Thus direct monitoring of icing conditions reduces need for excessive turbine bleed air and enhances turbine operational efficiency.

Figure 1:
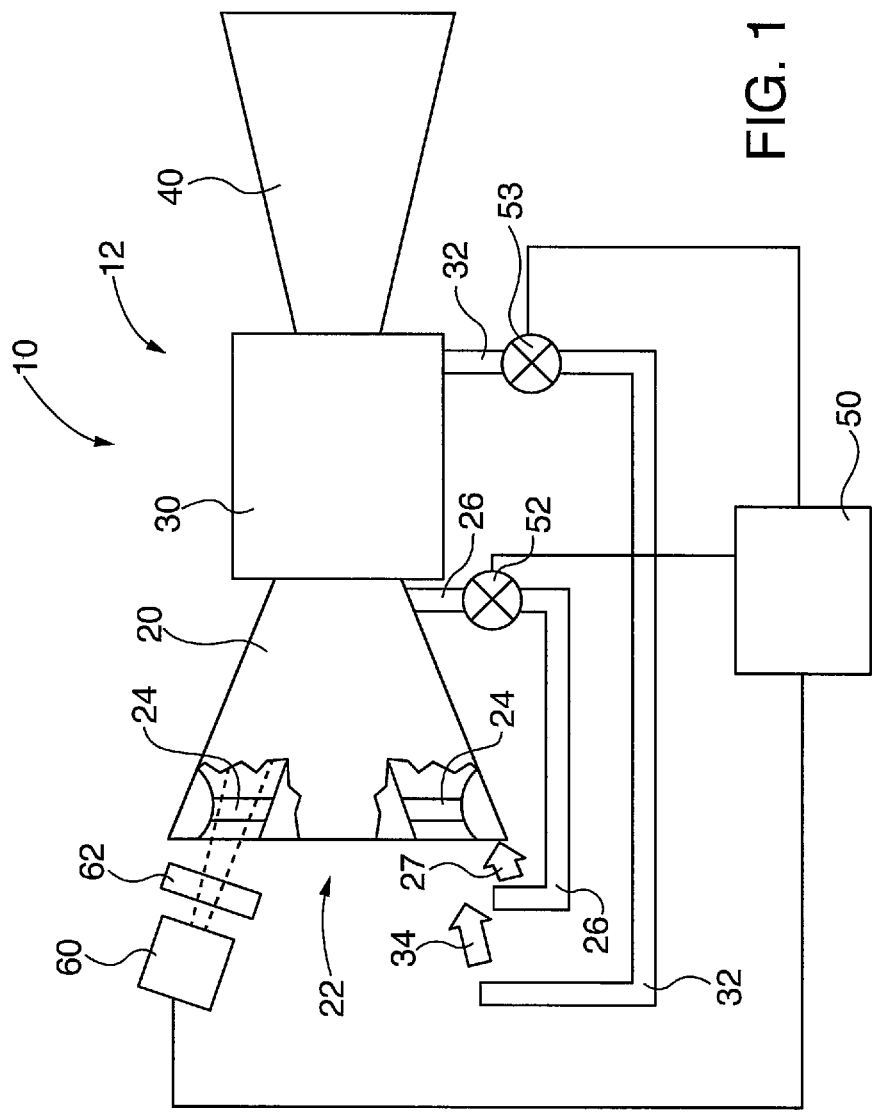
FIG. 1 is a schematic block diagram of a system for detecting and alleviating ice formation on inlet guide vanes of a gas turbine that is constructed in accordance with an embodiment of the invention.

FIG. 1 is a schematic block diagram of a system 10 for detecting and alleviating ice formation on inlet guide vanes of a gas turbine 12 that is constructed in accordance with an embodiment of the invention. The gas turbine 12 is of known construction and includes a compressor section 20, combustor section 30 and turbine section 40. The compressor section 20 includes an air inlet 22 for introduction of intake airflow, a plurality of inlet guide vanes (IGVs) 24 and a compressed air bleed 26 for selectively bleeding compressed air 27 generated by the compressor section into the air inlet 22. The combustor section 30 has a heated air bleed 32 for selectively bleeding heated air 34 generated by the combustor section into the air inlet 22. The respective compressed air 27 and heated air 34 bleed flows are selectively introduced into the air inlet 22 under guidance by a controller 50 and respective control valves 26, 32 of a known gas turbine operational control system, in order to alter intake airflow properties of temperature and relative humidity to inhibit or prevent ice formation on the IGVs 24, so that ice is not ingested by the gas turbine 12.

Figure 2:
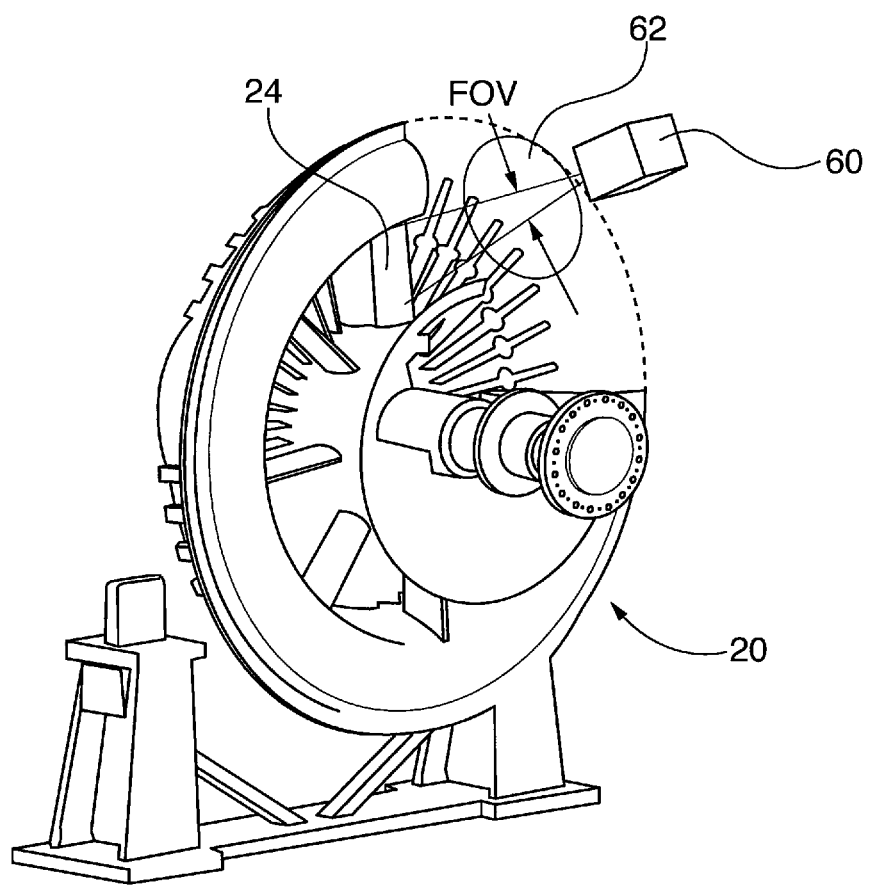
FIG. 2 is a partially cut away schematic perspective view of an infra-red camera viewing an inlet guide vane of a gas turbine in accordance with an embodiment of the invention.
Figure 3:
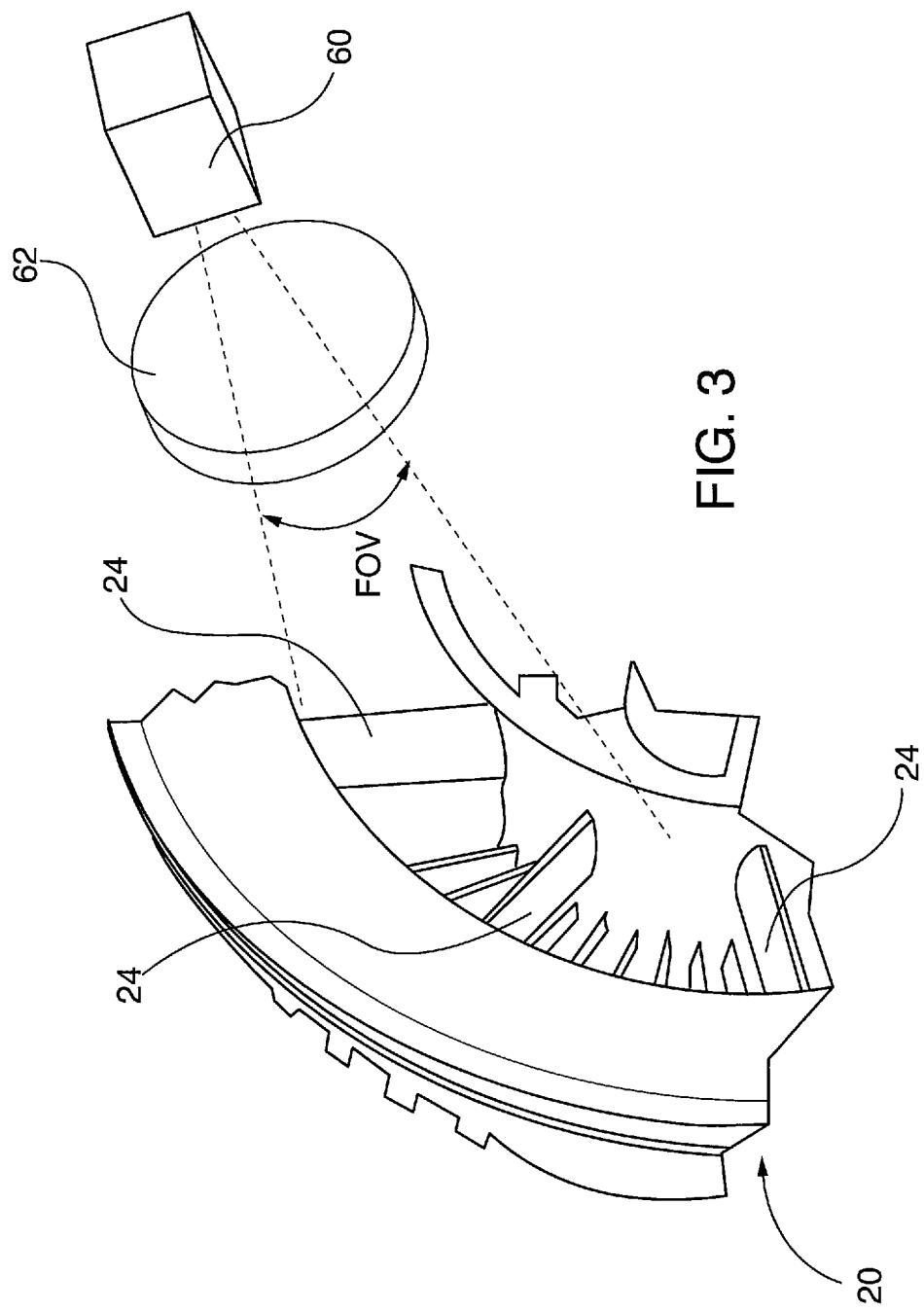
FIG. 3 is a partially cut away schematic perspective view of an infra-red camera viewing a plurality of inlet guide vanes of a gas turbine in accordance with an embodiment of the invention.

Referring to FIGS. 1-3, the monitoring and control system 10 has at least one infra-red camera 60 coupled to the controller 50, for viewing one or more IGVs 24 within a camera field of view (FOV). The camera 60 is preferably mounted outside the gas turbine 12, such as outside the compressor section 20, and views at least one IGV 24 through an optically transparent window 62 within a housing of the gas turbine.

Figure 4:
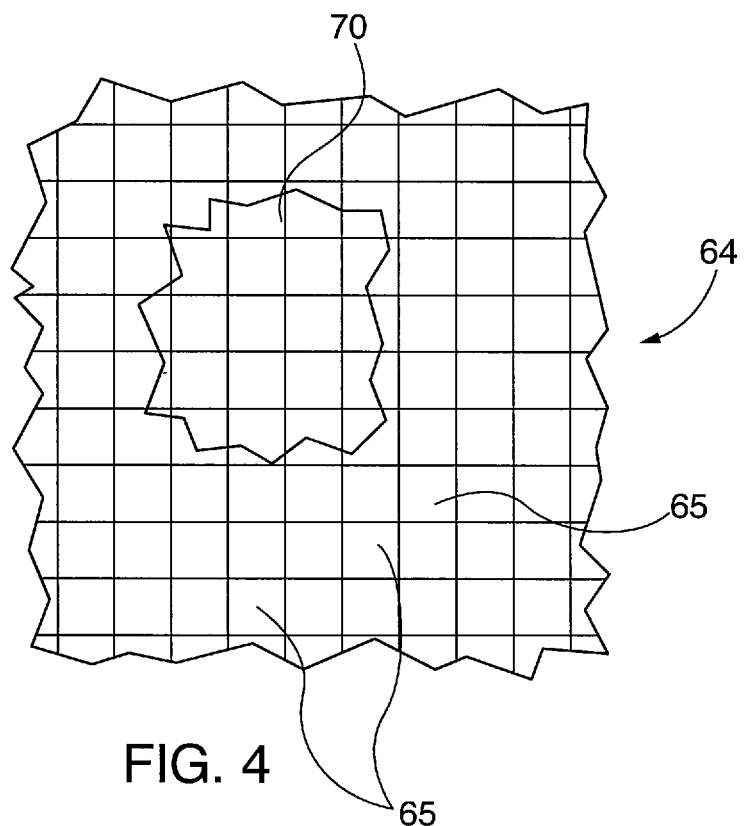
FIG. 4 is a fragmentary schematic view of an infra-red camera detector and detector pixels emissivity intensity image, in accordance with an embodiment of the invention.

As shown in FIG. 4, the camera 60 preferably comprises a micro bolometer detector 64 with an array of pixels 65, in which detector electrical conductivity changes in response to detected emissivity temperature changes. For example, the pixels encompassing the zone 70 have lower emissivity intensity and thus are indicating a lower temperature than those outside that zone. A suitable infra-red detector wavelength range is 3-13 μm, and advantageously in the 8-13 μm "long" infra-red wavelength range, which is monitored by commercially available infra-red cameras.

Figure 5:
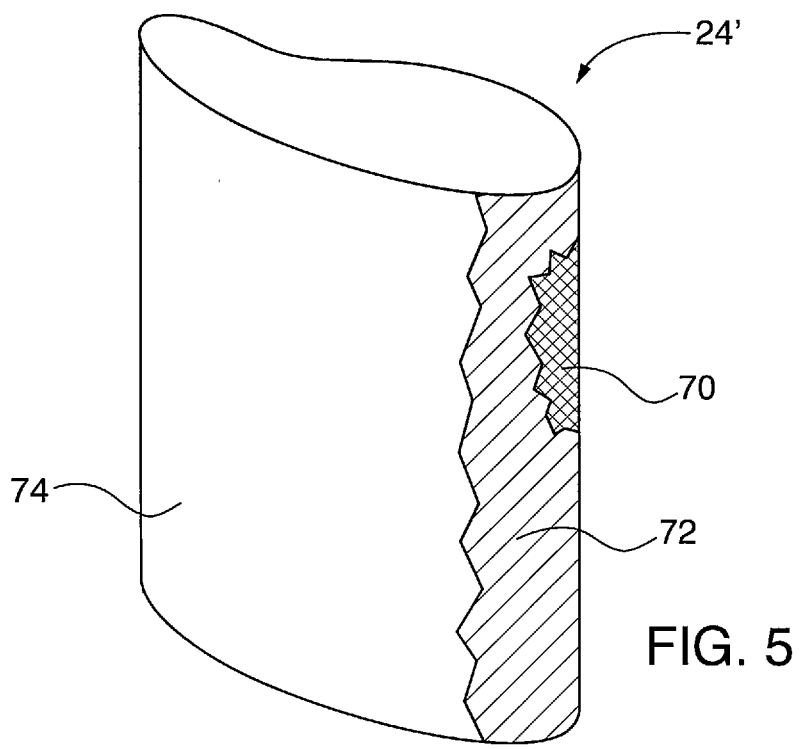
FIG. 5 is a schematic perspective view of an infra-red camera emissivity intensity image of an inlet guide vane in accordance with an embodiment of the invention.

FIG. 5 shows an exemplary conceptual infra-red camera 60 image of an inlet guide vane (IGV) 24' that has a lowest emissivity intensity zone 70 which is in the emissivity range of solidified water ice, a relatively higher emissivity intensity zone 72 indicative of a the remainder of the ice-free leading edge of the IGV and the highest intensity zone 74 on the upper IGV airfoil surface. Emissivity intensity can vary across a surface of an ice-free IGV, due to variations of airflow velocity striking the leading edge versus other portions of the surface, surface roughness or blade coating variations, etc. Detected emissivity of ice is significantly different from the range of detected emissivity generated by variations across ice-free IGV surfaces.

The controller 50, which may be integrated with a known gas turbine operational control system or as a stand-alone programmable electronic controller that is in communication with the operation control system, is configured to correlate ice formation with an emissivity intensity that is detected by the infra-red camera 60. When ice formation is detected or identified by the controller 50 it can enunciate such condition to the gas turbine operational control system for commencement of alleviation action, such as introducing bleed compressed 27 and/or heated 34 air flows from the gas turbine 12 into the air intake 22. The bleed airflow modifies properties of the intake airflow to reduce relative humidity and/or to raise the dew point above water freezing temperature, so that ice no longer forms on the IGV 24 surfaces.

The controller 50 operational methods may be configured to correlate the following exemplary emissivity variations with an inlet guide vane ice formation condition that trigger alleviation action by the anti-icing system:
viewed inlet guide vane aggregate emissivity intensity dropping below a defined threshold;
defined percentage of viewed inlet guide vane having emissivity intensity dropping below a defined threshold;
mapping of viewed inlet guide vane emissivity intensity and identification of mapping patterns; and
viewed inlet guide vane rate of emissivity intensity drop exceeding a defined threshold.
Other known types of known emissivity intensity monitoring methods and control triggers may be substituted for these exemplary methods.

Figure 6:
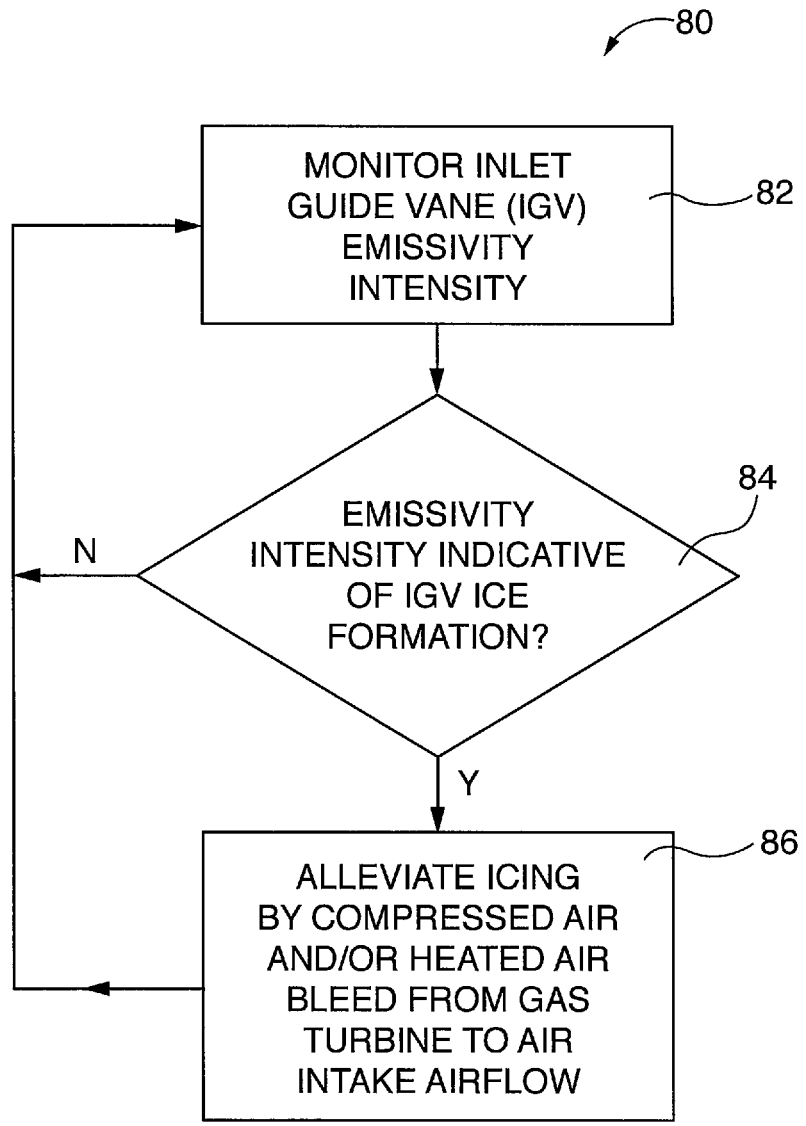
FIG. 6 is a flowchart of sequential steps performed by a system controller in a system for detecting and alleviating ice formation on inlet guide vanes of a gas turbine in accordance with an embodiment of the invention.

The controller 50 may monitor and alleviate inlet guide vane 24 icing conditions in a feedback loop 80, as shown in FIG. 6. Inlet guide vane emissivity intensity is monitored continuously in real time or at a desired periodic sampling rate at step 82. The controller 50 evaluates monitored emissivity intensity and determines whether it is indicative of IGV ice formation at step 84. If no ice formation is detected the sampling loop step 82 is repeated in a continuous loop. If ice formation is detected at step 84 the controller 50 causes the anti-icing system to alleviate the icing condition at step 86, such as by introducing compressed 27 or heated 34 bleed air into the air intake 22 airflow, to alter intake airflow properties (e.g., lower intake airflow relative humidity and/or raise its temperature so that the dew point is above water freezing temperature). The monitoring 82, evaluation 84 and alleviation 86 steps are repeated in a continuous loop until the previously detected icing condition is remedied, at which time bleed air introduction into the air intake 22 airflow is lowered or ceased entirely.

While embodiments of the present invention present an opportunity to minimize need for turbine bleed air in a direct monitoring feedback loop a gas turbine operator may wish to operate the ice monitoring and control system with a greater quantity and frequency of bleed air, such as by adhering to known empirical control systems based on indirect monitoring of atmospheric conditions, while for example using the present invention as an additional operational monitoring layer. Alternatively the turbine operator may wish to supplement the quantity and frequency of bleed air determined to be needed by the present invention monitoring system, for example by operating the system continuously with a set quantity and frequency of bleed air as a base line, with the system adding additional bleed air as needed based on the actively monitored ice formation conditions.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for detecting and alleviating ice formation on inlet guide vanes of a gas turbine, comprising:
viewing a gas turbine inlet guide vane with an infra-red camera, wherein the infra-red camera is placed external the gas turbine and the inlet guide vane is viewed through a viewing window within a housing of the gas turbine;
actively monitoring emissivity intensity of the inlet guide vane with the infra-red camera in a wavelength range indicative of ice formation;
detecting when monitored emissivity is indicative of ice formation on the inlet guide vane wherein ice formation is indicated when a viewed inlet guide vane emissivity intensity drops below a threshold amount indicating ice formation;
alleviating the detected ice formation by altering intake airflow properties into the gas turbine; and wherein the alleviating step comprising bleeding compressor pressurized air and combustor heated air into the gas turbine intake airflow in a feedback loop with the detecting step.

2. The method of claim 1, the infra-red camera comprising a micro bolometer detector in which detector electrical conductivity changes in response to temperature changes.

3. The method of claim 1, the monitored emissivity ice formation indication comprising viewed inlet guide vane aggregate emissivity intensity dropping below a defined threshold.

4. The method of claim 1, the monitored emissivity ice formation indication comprising a defined percentage of viewed inlet guide vane having emissivity intensity dropping below a defined threshold.

5. The method of claim 4 the defined percentage determined by comparing percentage of camera detector pixels indicating intensity above and below the defined threshold.

6. The method of claim 1, the monitored emissivity ice formation indication comprising mapping of viewed inlet guide vane emissivity intensity and identification of mapping patterns.

7. The method of claim 1 further comprising performing the viewing, actively monitoring and detecting steps on a plurality of inlet guide vanes simultaneously.

8. The method of claim 1, the infra-red camera actively monitoring emissivity intensity of the inlet guide vane in a wavelength range of 3-13 µm.

9. A method for detecting and alleviating ice formation on inlet guide vanes of a gas turbine, comprising:
- viewing a gas turbine inlet guide vane with an infra-red camera having a micro bolometer detector in which detector electrical conductivity changes in response to temperature changes, wherein the infra-red camera is placed external the gas turbine and the inlet guide vane is viewed through a viewing window within a housing of the gas turbine;
- actively monitoring emissivity intensity of the inlet guide vane with the infra-red camera in a wavelength range of 3-13 μm;
- detecting when monitored emissivity is indicative of ice formation on the inlet guide vane wherein ice formation is indicated when a viewed inlet guide vane emissivity intensity drops below a threshold amount indicating ice formation; and
- alleviating the detected ice formation by altering intake airflow properties into the gas turbine comprising bleeding compressor pressurized air and combustor heated air into the gas turbine intake airflow in a feedback loop with the detecting step.

10. The method of claim 9, the monitored emissivity ice formation indication selected from the group consisting of: viewed inlet guide vane aggregate emissivity intensity dropping below a defined threshold; defined percentage of viewed inlet guide vane having emissivity intensity dropping below a defined threshold; and mapping of viewed inlet guide vane emissivity intensity and identification of mapping patterns.

11. The method of claim 9, further comprising performing the viewing, actively monitoring and detecting steps on a plurality of inlet guide vanes simultaneously.

12. A system for detecting and alleviating ice formation on inlet guide vanes of a gas turbine, comprising:
- an infra-red camera viewing a gas turbine inlet guide vane and capturing emissivity intensity images of the inlet guide vane, wherein the infra-red camera is placed external the gas turbine and the inlet guide vane is viewed through a viewing window within a housing of the gas turbine;
- a controller coupled to the infra-red camera that actively monitors the infra-red camera emissivity intensity images in a wavelength range indicative of ice formation, detects when monitored emissivity is indicative of ice formation on the inlet guide vane and sends output commands to the gas turbine to alter intake airflow properties into the gas turbine in response to detected ice formation, so as to alleviate ice formation on the inlet guide vane wherein ice formation is indicated when a viewed inlet guide vane emissivity intensity drops below a threshold amount indicating ice formation; and wherein the controller alters intake air flow properties by bleeding compressor pressurized air and combustor heated air into the gas turbine intake airflow in a feedback loop.

13. The system of claim 12, the infra-red camera comprising a micro bolometer detector in which detector electrical conductivity changes in response to temperature changes.

14. The system of claim 12, the infra-red camera actively monitoring emissivity intensity of the inlet guide vane in a wavelength range of 3-13 μm.

15. The system of claim 12 actively monitoring a plurality of inlet guide vanes simultaneously by at least one infra-red camera.

16. The system of claim 12, the controller monitored emissivity ice formation indication selected from the group consisting of: viewed inlet guide vane aggregate emissivity intensity dropping below a defined threshold; defined percentage of viewed inlet guide vane having emissivity intensity dropping below a defined threshold; and mapping of viewed inlet guide vane emissivity intensity and identification of mapping patterns.

* * * * *